June 2, 1925.

H. A. GRANT

MILK COOLING PAN

Filed May 2, 1924

1,540,002

H. A. Grant, Inventor

By C.A.Snow & Co.

Attorneys

Patented June 2, 1925.

1,540,002

UNITED STATES PATENT OFFICE.

HUGHT ALEXANDER GRANT, OF MALONE, NEW YORK.

MILK-COOLING PAN.

Application filed May 2, 1924. Serial No. 710,591.

*To all whom it may concern:*

Be it known that I, HUGHT ALEXANDER GRANT, a citizen of the United States, residing at Malone, in the county of Franklin and State of New York, have invented a new and useful Milk-Cooling Pan, of which the following is a specification.

This invention relates to milk coolers and more particularly to milk pans.

The object of the invention is to provide a milk cooling pan through which the milk is passed in its passage to a shipping can and which is designed for use in connection with a cooler or refrigerator of the type shown in my copending application and which is illustrated herein in light lines.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the embodiment illustrated a pan 1 is shown adapted to be mounted on the lower end of a refrigerator R having an outlet O for the cold air which is designed to impinge against the flowing milk to effect a cooling operation.

Figure 1:
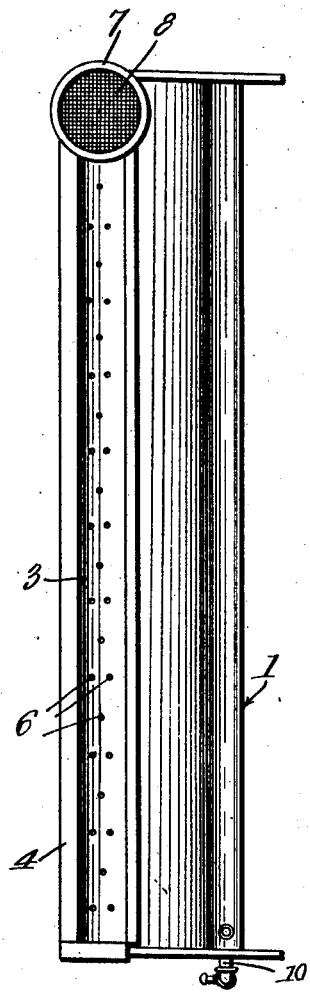
Figure 1 represents a top plan view of a pan constructed in accordance with this invention.
Figure 3:
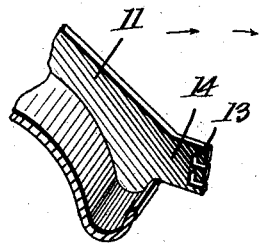
Fig. 3 is a detail perspective view of one end of the pan showing the means for connecting it with a support.
Figure 2:
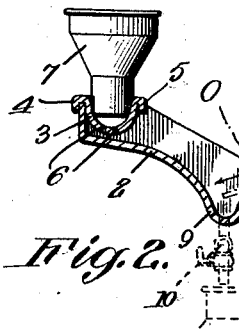
Fig. 2 is a transverse section of the pan shown applied, the refrigerator in connection with which it is used being shown in light lines.

The pan 1 which is preferably of a length corresponding to the length of the refrigerator, has a concavo-convex bottom 2 the convexed portion being located inside the pan and designed to operate as a spreader for the milk to flow over in its passage from a trough 3 located at the upper outer edge of the pan. This trough 3 has downturned flanges 4 and 5 to form pan engaging elements as is shown clearly in Fig. 2. This trough 3 is provided in its bottom throughout its length with a plurality of small apertures 6 through which the milk is designed to pass and be distributed over the convexed bottom 2 of the pan so that it will flow in a thin film over said pan bottom and be thoroughly aerated and also be subjected to the outflowing current of cold air passing out of the refrigerator through its outlet O.

A funnel 7 is mounted at one end of the trough 3 and is preferably equipped with a strainer 8, the milk being poured into this funnel and passing down trough 3 out into the pan 1 through the perforations 6.

A trough 9 is formed in the bottom 2 adjacent one side thereof and is designed to receive the aerated milk and from which it is conducted through a valve control spout 10 to a milk can C.

Figure 4:
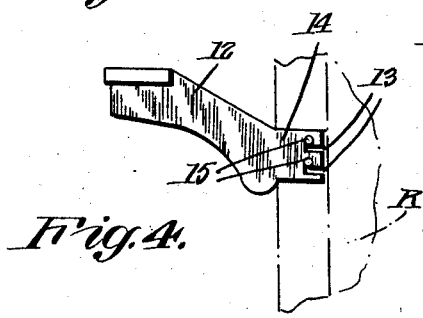
Fig. 4 is an end elevation shown applied.

The end members 11 and 12 of the pan are preferably provided with bayonet slots 13 formed in extensions 14 of said ends and which are designed to be interlockingly engaged with studs 15 projecting laterally from the ends of the refrigerator as is shown clearly in Fig. 4.

The funnel 7 is removably mounted in trough 3 and trough 3 is detachably engaged with pan 1 so that the various parts may be removed for washing or for other purposes.

I claim:

1. An elongated trough-like pan having a convexo-concave bottom and provided with upstanding side and end flanges, a longitudinally extending trough located adjacent one side flange having a valve controlled spout leading therefrom, a trough removably mounted on the other side flange and extending throughout the length of the pan, said trough being provided with a plurality of apertures in the bottom thereof with the bottom spaced above the pan bottom.

2. An elongated trough-like pan having a convexo-concave bottom and provided with upstanding side and end flanges, a longitudinally extending trough located adjacent one side flange having a valve controlled spout leading therefrom, a trough removably mounted on the other side flange and extending throughout the length of the pan, said trough being provided with a plurality of apertures in the bottom thereof with the bottom spaced above the pan bottom, the end members of said pan being equipped with extensions having bayonet slots for connection with a support.

3. An elongated trough-like pan having a convexo-concave bottom and provided with upstanding side and end flanges, a longitudinally extending trough located adjacent one side flange having a valve controlled spout leading therefrom, a trough removably mounted on the other side flange and extending throughout the length of the pan, said trough being provided with a plurality of apertures in the bottom thereof with the bottom spaced above the pan bottom, said removable trough having down-turned flanges on its side edges to form pan clamping elements and adapted to fit over the upper edge of one side flange to support the trough on the pan.

In testimony that I claim the foregoing as my own, I have hereto affixed my signature in the presence of two witnesses.

HUGHT ALEXANDER GRANT.

Witnesses:
 MARGARET GRANT,
 ALLIE GRANT.